US008141036B2

(12) United States Patent
Wagner et al.

(10) Patent No.: US 8,141,036 B2
(45) Date of Patent: Mar. 20, 2012

(54) CUSTOMIZED ANNOTATION EDITING

(75) Inventors: Timothy A. Wagner, Seattle, WA (US);
Gary Horen, Seattle, WA (US)

(73) Assignee: Oracle International Corporation,
Redwood Shores, CA (US)

( * ) Notice: Subject to any disclaimer, the term of this patent is extended or adjusted under 35 U.S.C. 154(b) by 1172 days.

(21) Appl. No.: 11/213,360

(22) Filed: Aug. 26, 2005

(65) Prior Publication Data

US 2007/0011651 A1    Jan. 11, 2007

Related U.S. Application Data

(60) Provisional application No. 60/697,313, filed on Jul. 7, 2005.

(51) Int. Cl.
*G06F 9/44* (2006.01)
*G06F 17/00* (2006.01)

(52) U.S. Cl. ............... 717/113; 717/111; 715/230

(58) Field of Classification Search .......... 717/110–113; 704/2–10; 715/230–233
See application file for complete search history.

(56) References Cited

U.S. PATENT DOCUMENTS

| | | | | |
|---|---|---|---|---|
| 6,623,529 | B1 * | 9/2003 | Lakritz | 715/205 |
| 6,799,718 | B2 * | 10/2004 | Chan et al. | 235/375 |
| 6,836,883 | B1 * | 12/2004 | Abrams et al. | 717/140 |
| 7,246,104 | B2 * | 7/2007 | Stickler | 707/999.002 |
| 2001/0027460 | A1 * | 10/2001 | Yamamoto et al. | 707/536 |
| 2002/0100016 | A1 * | 7/2002 | Van De Vanter et al. | 717/112 |
| 2003/0028364 | A1 * | 2/2003 | Chan et al. | 704/1 |
| 2003/0088573 | A1 * | 5/2003 | Stickler | 707/100 |
| 2004/0003013 | A1 * | 1/2004 | Coulthard et al. | 707/205 |
| 2004/0040011 | A1 * | 2/2004 | Bosworth et al. | 717/114 |
| 2005/0108682 | A1 * | 5/2005 | Piehler et al. | 717/110 |

OTHER PUBLICATIONS

Sun Microsystems. "A Program Annotation Facility for the Javatm Programming Language: JSR-175 Public Draft Specification" Nov. 5, 2003. Sun Microsystems. Downloaded from http://jcp.org/aboutJava/communityprocess/review/jsr175/index.html on Apr. 30, 2009.*
Wing, Ben. Based on prior work by Bil Lewis, Dan LaLiberte, Richard Stallman and the GNU Manual Group. "XEmacs Lisp Reference Manual." GNU Manual Group. Version 3.4, May 1999. pp. 341-349 and 365. Retrieved from ftp.xemacs.org/pub/xemacs/docs/letter/lispref-letter.pdf.gz on Oct. 23, 2009.*
W3C Members, and Dave Raggett, Arnaud Le Hors and Ian Jacobs, editors. "HTML 4.01 Specification, Chapter 18, Scripts," Dec. 24, 1999. W3C Recommendation. pp. 1-22. Retrieved from www.w3.org on Nov. 16, 2010.*
Alvestrand, H. "Tags for the Identification of Languages". Network Working Group Request for Comments: 3066 (RFC3066).Jan. 2001. pp. 1-13. Retrieved from http://www.ietf.org/rfc/rfc3066.txt on Mar. 25, 2011.*

* cited by examiner

*Primary Examiner* — Li Zhen
*Assistant Examiner* — Erika Kretzmer
(74) *Attorney, Agent, or Firm* — Squire Sanders (US) LLP

(57) ABSTRACT

An integrated development system for editing computer software code defines an annotation that includes an annotation identifier, at least one value, and an associated language for each value. The system displays the annotation identifier with a first value in an editing user interface. The system detects that a user is editing the first value. In response to the detecting, the system automatically revises the display of the first value based on a corresponding first language.

24 Claims, 5 Drawing Sheets

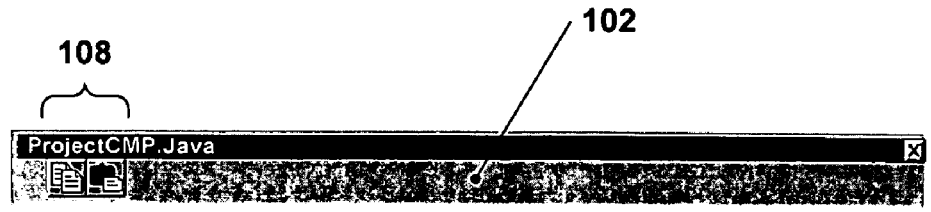

```
public abstract class ProjectCMP implements EntityBean {
    public abstract String getName();
    public abstract void setId(Integer id);
    public abstract void setName(String name);

public Integer ejbCreate(Integer id, String name)
        throws CreateException {
            QueryDataSet ds;
            @Foo("select * from tableA where f1 = 34")
            ds.fetchRecords;
            ds.close
            setId(id);
            setName(name);
            return null;
    }
}
```

*Figure 2*

CUSTOMIZED ANNOTATION EDITING

CLAIM OF PRIORITY

This application claims priority to the following provisional application which is herein included in its entirety:

U.S. Provisional Application No. 60/697,313 entitled CUSTOMIZED ANNOTATION EDITING, by Timothy A. Wagner, filed Jul. 7, 2005.

FIELD OF THE DISCLOSURE

The present disclosure relates generally to a means for customizing the editing experience for an annotation value and, more particularly, a means for providing programming language aware editing for annotation values in interactive software development environments.

BACKGROUND

Contemporary software development is aided in a large part by rich, interactive development environments (IDEs) that provide advanced features such as interactive debugging, context-sensitive editing, token coloring, code completion, the ability to easily lookup definitions and/or uses of symbols, incremental syntax/semantic checking and compilation, error correction and refactoring. One shortcoming of such environments has to do with the handling of annotations which can be interspersed between source code statements. By way of example, annotations can provide directives for code generation, specify runtime behaviors, and arrange for other capabilities not expressed in the source code. An annotation value itself can be specified as a statement in a given programming language. However, when a user attempts to enter or modify the annotation's value, the advanced features discussed above which are available for source code editing vanish. What is needed is a way to provide the same richness to the annotation editing experience.

BRIEF DESCRIPTION OF THE DRAWINGS

FIG. 2 is an illustration of customized editing for an annotation value in accordance to an embodiment.

DETAILED DESCRIPTION

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Examples are given in terms of Java®, JavaBeans and Structured Query Language (SQL), however those of skill in the art will recognize that the teachings herein are applicable to annotations of any kind, not merely those illustrated. By way of example, an annotation might be additional information provided with a digital document such as a reviewer's comments or a citation. While software development tools can be enriched by providing an editing experience tailored to an annotation's value, tools in other domains can naturally be improved as well. (The Java® platform, programming language and Enterprise JavaBeans are available from Sun Microsystems, Inc. Java® is a registered trademark of Sun Microsystems, Inc.)

Figure 1:
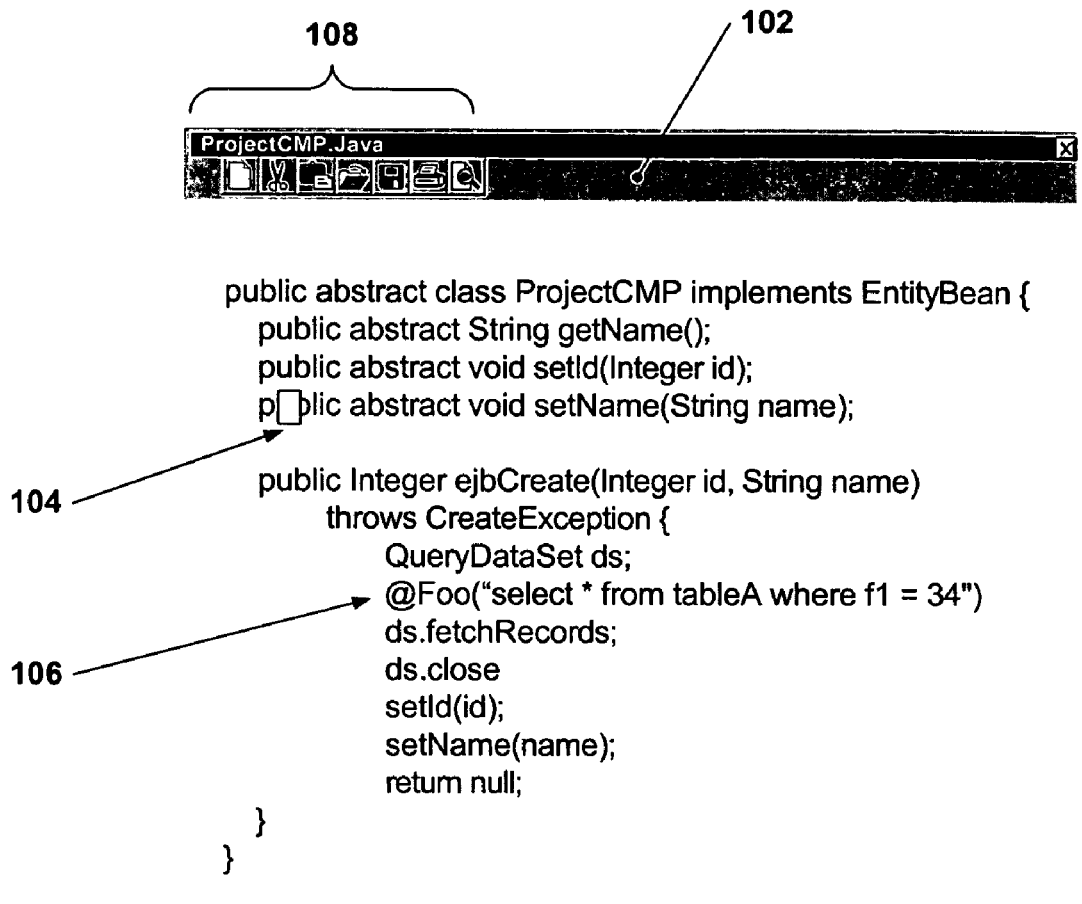
FIG. 1 is an illustration an interactive editor in which a portion of a computer program containing an annotation is displayed in accordance to an embodiment.
Figure 3:
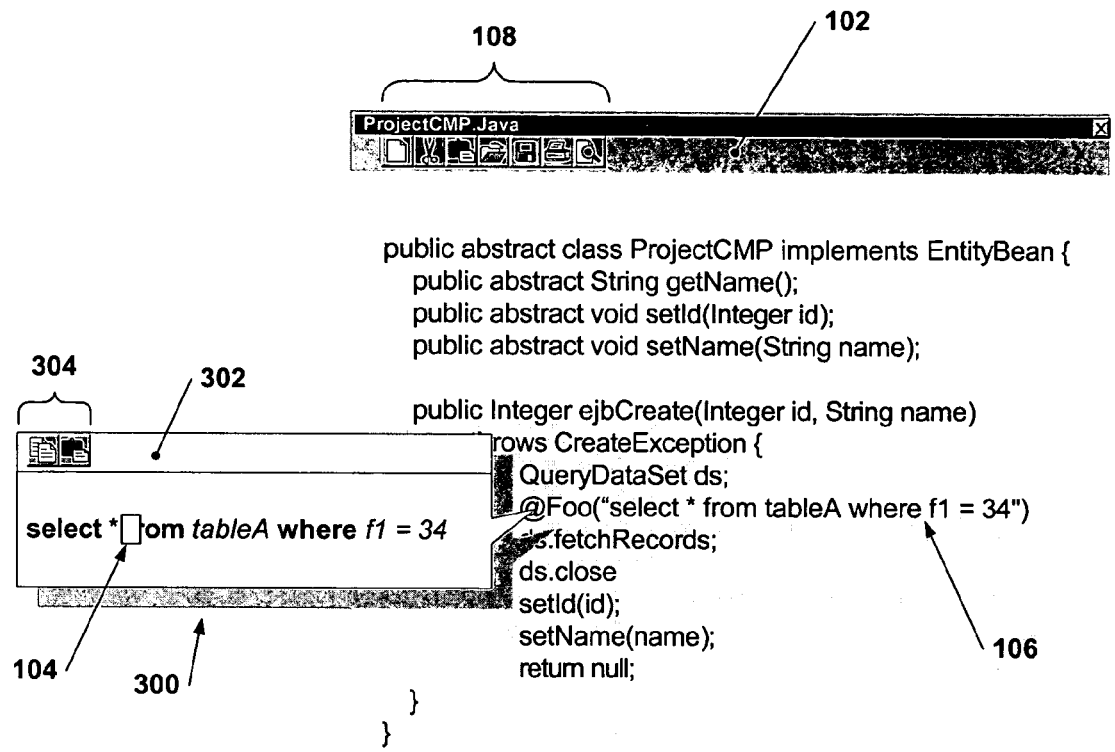
FIG. 3 is another illustration of customized editing for an annotation value in accordance to an embodiment.

FIGS. 1-3 illustrate a graphical user interface for an interactive source code editor in accordance to various embodiments. In aspects of these embodiments, the editor can be part of a larger IDE. In another embodiment (not shown), the editor can allow a user to compose and edit a program by manipulation of graphical symbols representing program logic and control flow. A user can select an item in the editor with an input device such as (but not limited to) a computer mouse. The movement of the mouse on a physical surface is translated to movement of a graphical pointer symbol (e.g., an arrow) across the editing pane. Although these figures illustrate a graphical user interface, a user interface is not limited to such and can include one or more of the following: an ability to respond to sounds and/or voice commands; an ability to respond to input from a remote control device (e.g., a cellular telephone, a PDA, or other suitable remote control); an ability to respond to gestures (e.g., facial and otherwise); an ability to respond to commands from a process on the same or another computing device; and an ability to respond to input from a computer mouse and/or keyboard. This disclosure is not limited to any particular user interface. Those of skill in the art will recognize that many other user interfaces presently known and yet to be developed are possible and fully within the scope and spirit of this disclosure.

FIG. 1 is an illustration an interactive editor 100 in which a portion of a computer program containing an annotation 106 is displayed in accordance to an embodiment. By way of example, the editor can be a "smart" source code editor designed to aid users in writing software in a given programming language such as Java®. A cursor 104 indicates to the user the current insertion point in the source code that is being edited. Depending on the location (or editing context) of the cursor and what the user types, smart editors typically provide dynamic features such as (but not limited to) token coloring, code completion, the ability to easily lookup definitions and/or uses of symbols, incremental syntax/semantic checking, error correction and refactoring. Likewise, a toolbar/menu 102 similarly offers capabilities dynamically customized to the editing context. For example, the toolbar buttons 108 may change in number, function and appearance depending on the editing context.

In one embodiment, an annotation is compatible with Java Specification Request (JSR) 175. By way of illustration, an annotation can be declared as follows:

```
@interface Foo {
    @language("SQL")
    String value( );
}
```

In this example, an annotation type declaration begins with @interface followed by an identifier for the annotation (Foo). Declaring an annotation creates a Java® interface that can be used by programs to read the annotation. In one embodiment, a meta-annotation can be used to associate a language with the annotation type declaration such that a tool that reads the annotation can provide a customized editing experience for the language. Here, the meta-annotation @language("SQL") is used to indicate that the following member (value) will hold an SQL expression. The language meta-annotation is not limited to SQL. By way of illustration, a language can be one or more of the following: a programming language (e.g., Java®, C++, C#, Basic, symbolic programming languages, functional programming languages, object-oriented programming languages, aspect-oriented programming languages, etc.), a descriptive language (e.g., Hypertext Markup Language, eXtensible Markup Language (XML), XML Schema, etc.), or a natural language (e.g., English, Russian, Chinese, etc.). A person skilled in the art will recognize that other languages, both known and yet to be developed, may be used without departing from the scope and spirit of the present disclosure.

In one embodiment, an annotation can have a plurality of members wherein each member can have a language associated with its value:

```
@interface Query {
    @language("SQL")
    String query( );
    @language("XML")
    String result-format( );
}
```

Here, the value of the query member is an SQL expression and the value of the result-format member is an XML document. In a further embodiment, an annotation can have any number of members arranged in a hierarchy wherein a member can include other members.

By way of illustration, programs can query runtime-visible annotations of their own program elements (reflection/introspection) or query the annotation types of external programs. By way of further illustration, an editing system can utilize a compile-time/build-time/edit-time system which is similar in nature to reflection/introspection, but which does not require the generation of class files. This is called mirroring. Annotation type information can be used to enable a customized editing experience for an annotation value. In one embodiment, and as illustrated in FIG. 2, a customized editing experience can be provided within the user's current editor (e.g., as an overlay or in-line editor). In one embodiment, when it is detected that an annotation member's value is about to be edited (or is being edited), an editing experience customized for that member's language is provided. In this example, the SQL keywords (i.e., "select", "from" and "where") in the SQL expression have been redrawn in bold typeface. Likewise, the parameters to the expression are shown in italic font (i.e., "tableA" and "f1=34"). Toolbar 102 buttons 108 have been customized to reflect capabilities relevant to editing SQL. Other capabilities including but not limited those described above can be customized for SQL and the editing context.

In another embodiment, the customized editing experience can be provided in a setting detached from the primary editor 100 as shown in FIG. 3. By way of illustration, a pop-up editor window 300 is provided to allow editing of an annotation. The pop-up editor includes its own toolbar 302 and toolbar buttons 304 which provide capabilities customized for editing an annotation member's value. The pop-up editor can be invoked by an attempt to edit the annotation in editor 100 and/or through a command provided to editor 100. Alternative editors are possible such as, but not limited to, document structure view editors, graphical editors, etc. Those of skill in the art will appreciate other types of editors currently known and yet to be developed our fully within the scope and spirit of the present disclosure.

Figure 4:
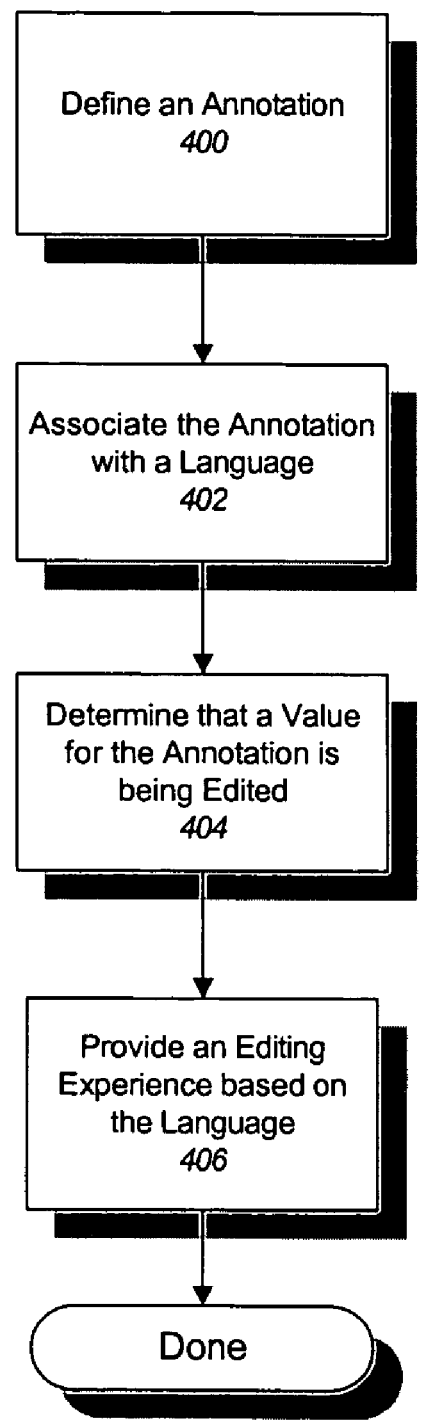
FIG. 4 is a flow diagram illustration of annotation definition and processing in accordance to an embodiment.

FIG. 4 is a flow diagram illustration of annotation definition and processing in accordance to an embodiment. Although this figure depicts processing in a particular order for purposes of illustration, one skilled in the art will appreciate that various processes portrayed in this figure can be omitted, rearranged, performed in parallel, combined and/or adapted in various ways. In block 400, an annotation is defined. In one embodiment and by way of illustration, the annotation can be defined according to JSR 175. A language is associated with an annotation member or the annotation as a whole in block 402. In one embodiment, the language association is made by way of a meta-annotation. In another embodiment, the association is specified elsewhere but made accessible to tools such as smart editors. In yet another embodiment, the language association is determined dynamically based on the value supplied for the annotation. For example, the value can be submitted to one or more language analyzers (e.g., parsers) to determine the language being entered. In block 404, the editor determines that an annotation is being edited or about to be edited. This determination can be based on user interaction with a user interface or by some other indication to the editor. In block 406, a customized editing experience is provided for the annotation value (e.g., the value of any of the annotation's members) based on the language associated with the annotation value.

Figure 5:
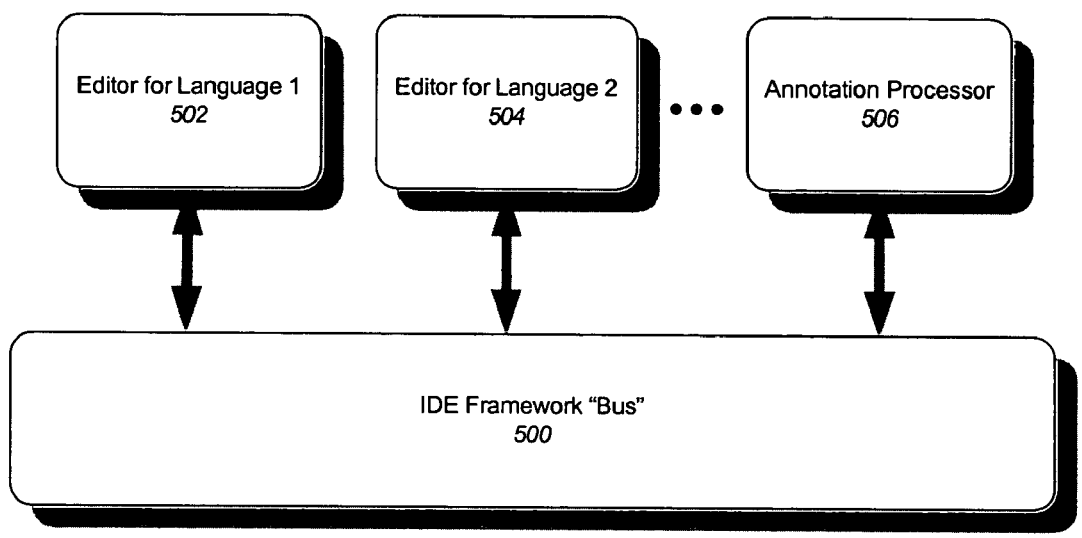
FIG. 5 is an illustration of an interactive software development environment in which various embodiments can be practiced.

FIG. 5 is an illustration of an extensible IDE software framework in accordance to an embodiment. The IDE framework includes a logical framework "bus" 500 into which framework software modules can integrate themselves into the IDE. In one embodiment, modules implement a programmatic interface and/or a protocol that is compatible with the bus. Through the bus, modules can advertise their services and dynamically discover the services of others. One such extensible IDE is WebLogic® Workshop, available from BEA Systems, Inc. (WebLogic® is a trademark of BEA Systems, Inc.) In one embodiment, two or more smart editor modules (502 and 504) capable of providing an editing experience for a programming language (L1) and the language of its annotation values (L2), respectively, are integrated into the IDE. An annotation processor 506 can process annotation declarations and language bindings. In one embodiment, the annotation processor provides information regarding the language associations of annotations to the editor modules. In yet another embodiment, the annotation processor is also capable of compiling language L1. Other modules (not shown) are possible including debuggers, name spaces, user interfaces, code generation, etc.

Although a diagram may depict components as logically separate, such depiction is merely for illustrative purposes. It will be apparent to those skilled in the art that the components portrayed can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A non-transitory computer readable medium having instructions stored thereon that, when executed by a processor, causes the processor to function as a computer software editor, the instructions comprising:

defining a Java® programming language annotation that comprises an annotation identifier, a plurality of members, a value for each member, and an associated language for each value of each member, wherein each associated language is indicated within the annotation, and wherein defining the annotation creates an interface used to read the annotation;

associating each associated language that is indicated within the annotation with each value using a Java® programming language meta-annotation, wherein an editing user interface that reads the annotation provides a customized editing experience for each associated language when editing each value;

displaying the annotation identifier with a first value and a first associated language in the editing user interface, wherein the displaying comprises interspersing the annotation identifier between source code statements of a second language different from the first associated language;

detecting that a user is editing or is about to edit the first value by detecting a cursor position within the first value; and in response to the detecting, dynamically revising the display of the first value, and the editing user interface based on the first associated language, wherein the annotation annotates a source code statement of the second language.

2. The computer readable medium of claim 1, wherein the dynamically revising comprises modifying the font of a portion of the first value.

3. The computer readable medium of claim 2, wherein the modified font is displayed in a separate pop-up editor window.

4. The computer readable medium of claim 1, wherein the editing user interface comprises a toolbar, wherein the toolbar allows for editing of each value, and the dynamically revising comprises revising the toolbar based on the first associated language upon detecting that a user is about to edit the first value.

5. The computer readable medium of claim 1, wherein the first associated language is Structured Query Language (SQL) and the first value comprises SQL keywords and SQL expressions.

6. The computer readable medium of claim 5, wherein the dynamically revising comprises modifying the SQL keywords to a first font and the SQL expressions to a second font.

7. The computer readable medium of claim 1, wherein the detecting comprises detecting an interaction by the user with the editing user interface.

8. The computer readable medium of claim 1, wherein the editing user interface is adapted to edit the second language that is different from the first associated language.

9. A computer implemented method for editing computer software code, the method comprising:

defining a Java® programming language annotation that comprises an annotation identifier, a plurality of members, a value for each member, and an associated language for each value of each member, wherein each associated language is indicated within the annotation, and wherein defining the annotation creates an interface used to read the annotation;

associating each associated language that is indicated within the annotation with each value using a Java® programming language meta-annotation, wherein an editing user interface that reads the annotation provides a customized editing experience for each associated language when editing each value;

displaying the annotation identifier with a first value and a first associated language in the editing user interface, wherein the displaying comprises interspersing the annotation identifier between source code statements of a second language different from the first associated language;

detecting that a user is editing or is about to edit the first value by detecting a cursor position within the first value; and in response to the detecting, dynamically revising the display of the first value and the editing user interface based on the first associated language, wherein the annotation annotates a source code statement of the second language.

10. The method of claim 9, wherein the automatically revising comprises modifying the font of a portion of the first value.

11. The method of claim 10, wherein the modified font is displayed in a separate pop-up editor window.

12. The method of claim 9, wherein the editing user interface comprises a toolbar, wherein the toolbar allows for editing of each value, and the dynamically revising comprises revising the toolbar based on the first associated language upon detecting that a user is about to edit the first value.

13. The method of claim 9, wherein the first associated language is Structured Query Language (SQL) and the first value comprises SQL keywords and SQL expressions.

14. The method of claim 13, wherein the dynamically revising comprises modifying the SQL keywords to a first font and the SQL expressions to a second font.

15. The method of claim 9, wherein the detecting comprises detecting an interaction by the user with the editing user interface.

16. The method of claim 9, wherein the editing user interface is adapted to edit the second language that is different from the first associated language.

17. A computer software integrated development system comprising:
a processor;
a computer readable medium coupled to the processor; and
an editor module stored in the computer readable medium, wherein the editor module comprises:
a defined a Java® programming language annotation that comprises an annotation identifier, a plurality of members, a value for each member, and an associated language for each value of each member, that is indicated within the annotation wherein the defined annotation creates an interface used to read the annotation;
associating each associated language that is indicated within the annotation with each value using a Java® programming language meta-annotation, wherein an editing user interface that reads the annotation provides a customized editing experience for each associated language when editing each value;
displaying the annotation identifier with a first value in an editing user interface;
displaying the annotation identifier with a first value and a first associated language in the editing user interface, wherein the displaying comprises interspersing the annotation identifier between source code statements of a second language different from the first associated language;
detecting that a user is editing or is about to edit the first value by detecting a cursor position within the first value; and
in response to the detecting, dynamically revising the display of the first value and the editing user interface based on the first associated language,
wherein the annotation annotates a source code statement of the second language.

18. The system of claim 17, wherein the dynamically revising comprises modifying the SQL keywords to a first font and the SQL expressions to a second font.

19. The system of claim 18, wherein the modified font is displayed in a separate pop-up editor window.

20. The system of claim 17, wherein the editing user interface comprises a toolbar, wherein the toolbar allows for editing of each value, and the dynamically revising comprises revising the toolbar based on the first associated language upon detecting that a user is about to edit the first value.

21. The system of claim 17, wherein the first associated language is Structured Query Language (SQL) and the first value comprises SQL keywords and SQL expressions.

22. The system of claim 21, wherein the dynamically revising comprises modifying the SQL keywords to a first font and the SQL expressions to a second font.

23. The system of claim 17, wherein the detecting comprises detecting an interaction by the user with the editing user interface.

24. The system of claim 17, wherein the editing user interface is adapted to edit the second language that is different from the first associated language.

* * * * *

UNITED STATES PATENT AND TRADEMARK OFFICE
CERTIFICATE OF CORRECTION

| | | |
|---|---|---|
| PATENT NO. | : 8,141,036 B2 | Page 1 of 1 |
| APPLICATION NO. | : 11/213360 | |
| DATED | : March 20, 2012 | |
| INVENTOR(S) | : Wagner et al. | |

It is certified that error appears in the above-identified patent and that said Letters Patent is hereby corrected as shown below:

On title page, in column 2, under "Other Publications", line 1, delete "Javatm" and insert -- JavaTM --, therefor.

In column 7, line 40, in Claim 17, delete "defined a" and insert -- defined --, therefor.

Signed and Sealed this
Fifth Day of June, 2012

David J. Kappos
*Director of the United States Patent and Trademark Office*